United States Patent
Bloom et al.

[11] Patent Number: 5,453,331
[45] Date of Patent: Sep. 26, 1995

[54] COMPLIANT SEALANTS FOR SOLID OXIDE FUEL CELLS AND OTHER CERAMICS

[75] Inventors: Ira D. Bloom; Kevin L. Ley, both of Bolingbrook, Ill.

[73] Assignee: University of Chicago, Chicago, Ill.

[21] Appl. No.: 289,751

[22] Filed: Aug. 12, 1994

[51] Int. Cl.$^6$ ........................................... H01M 8/10
[52] U.S. Cl. ................... 429/32; 429/30; 429/33; 429/35; 429/174; 429/185; 429/184
[58] Field of Search ................... 429/30, 35, 33, 429/32, 174, 184, 185; 501/10, 15, 32, 78

[56] References Cited

U.S. PATENT DOCUMENTS

| | | | |
|---|---|---|---|
| 4,291,107 | 9/1981 | Barry et al. | 429/104 |
| 4,476,196 | 10/1984 | Poeppel et al. | 429/32 |
| 4,476,197 | 10/1984 | Herceg | 429/32 |
| 4,476,198 | 10/1984 | Ackerman et al. | 429/32 |
| 4,499,663 | 2/1985 | Zwick et al. | |
| 4,666,798 | 5/1987 | Herceg | 429/12 |
| 4,761,349 | 8/1988 | McPheeters et al. | 429/39 |
| 4,833,049 | 5/1989 | Teaford et al. | 429/181 |
| 4,997,726 | 3/1991 | Akiyama et al. | 429/32 |
| 5,021,307 | 6/1991 | Brow et al. | 429/184 |
| 5,164,342 | 11/1992 | Muralidhan et al. | 501/20 |
| 5,169,506 | 12/1992 | Michaels. | |

Primary Examiner—Stephen Kalafut
Assistant Examiner—Richard H. Lilley, Jr.
Attorney, Agent, or Firm—Emrich & Dithmar

[57] ABSTRACT

A glass or glass-ceramic sealant for a SOFC having a coefficient of thermal expansion in the range of from about 8 to about $13\times10^{-6}$/°C. and a viscosity of at least $10^3$ Pa-s at cell operating temperature. The sealant has a composition of SrO present in the range of from about 5 to about 60 mole percent, $La_2O_3$ present in the range of from 0 to about 45 mole percent, $Al_2O_3$ present in the range from 0 to about 15 mole percent, $B_2O_3$ present in the range of from about 15 mole percent to about 80 mole percent, and $SiO_2$ present in the range of from 0 to about 40 mole percent, wherein the material is a viscous fluid at cell operating temperatures of from about 600° C. to about 1000° C. The sealant may also be compounds of CaO present in the range of from 0 to about 35 mole percent, $Al_2O_3$ present in the range from 0 to about 15 mole percent, $B_2O_3$ present in the range of from about 35 mole percent to about 85 mole percent, and $SiO_2$ present in the range of from 0 to about 30 mole percent.

13 Claims, 2 Drawing Sheets

COMPLIANT SEALANTS FOR SOLID OXIDE FUEL CELLS AND OTHER CERAMICS

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

This invention relates to solid oxide fuel cells (SOFCs) which are electrochemical devices that convert the chemical energy of a fuel into electricity without the use of a heat engine. In such a device operating on hydrogen, hydrocarbons, or other fuels, the change in the free energy of the cell reaction is directly available as electrical energy. The SOFCs operate with high energy conversion efficiency and very low pollutant emissions. The present-day SOFCs operate at 1000° C.; research is underway to develop materials and fabrication processes that would permit operation of the SOFCs at temperatures down to 800° C., or even lower.

The conventional SOFC is all ceramic in construction. It consists of a porous strontium-doped lanthanum manganite (LSM) air electrode, a dense calcia- or yttria-stabilized zirconia (YSZ) electrolyte, and a porous nickel-zirconium cermet (NZC) fuel electrode. These fuel cells are typically arranged in series in a fuel cell stack, where the individual cells are separated by a calcium or cobalt-doped lanthanum chromite (LC) bipolar separator plate (in some configurations a metallic separator plate may be used, instead). The materials provide good electrochemical activity and thermal expansion match to permit operation of the fuel cell stack at 800° to 1000° C. and repeated thermal cycling between room temperature and the operating temperature.

Two major types of fuel cell designs, tubular and planar, are being developed for the SOFC using the above materials. In all of these designs, the fuel (hydrogen) and oxidant (air) gases must be kept separate from each other before they react electrochemically in the fuel cell. In the tubular design being developed by Westinghouse Electric, and the planar design being developed by Technology Management, Inc., the inlet fuel and oxidant gases are kept separate from each other but the spent fuel gas is permitted to mix with and burn in the spent oxidant gas to generate the heat needed to preheat the air and maintain the high stack operating temperature. These two designs, therefore, require only minimal sealing of the gas flow passages; indeed, the Westinghouse design is commonly referred to as a seal-less design. In most other cell and stack designs, however, a gas-tight seal is required to keep the fuel and oxidant gases separate from each other, both within the stack and at the stack-to-manifold connections. Even in the Westinghouse design, the availability of a suitable sealant would permit added flexibility.

In the several different versions of the planar SOFC designs being developed, the individual cells must be arranged in a stack. To provide for the flow of the fuel and oxidant gases, while at the same time keeping the two gases separate, the edges of the cells must be sealed with a gas tight sealant. In addition, the gas supply and exit manifolds must be sealed to the stack. For instance, see the McPheeters et al. U.S. Pat. Nos. 4,761,349, the Poeppel et al. 4,476,196, the Herceg 4,476,197 and the Ackerman et al. 4,476,198. In certain designs, these gas manifolds are internal to the cell design and only supply and exhaust "tubes" need to be provided, which are made up of aligned holes in the cell structure. Even for the SOFCs with internal manifolds, effective sealants are necessary to form the appropriate gas flow tubes and channels.

Compliant sealants based on silica-based glasses have been used by some fuel cell developers. For example, Fuji Denki K.K. [Y. Harufuji, Jpn Kokai Tokyo JP 04-47, 672 (Feb. 17, 1992)]has described two types of soda-lime glasses, one solid and one liquid at 1000° C. These glasses were used, with limited success in their internally-manifolded, circular planar SOFC design. Because it is a solid at 1000° C., the former glass would not be expected to tolerate thermal expansion mismatch at temperatures below 1000° C. The latter glass may wick into the pores of the electrodes with time, decreasing cell performance. Both glass compositions contain highly-mobile sodium ions which can migrate into the SOFC component ceramics and degrade performance.

Dornier (see D. Stolten et al., and Spah et al., Fuel Cell Seminar Abstracts, Nov. 29–Dec. 2, 1992, pgs 253, 257) uses 2 silica-based glasses (referred to as hard and soft, respectively) in their externally manifolded, planar SOFC design. The hard glass is used to bond the manifold structure together. The soft glass is used at cell edges and at the stack-to-manifold junction. The ability to thermally cycle these structures has not yet been demonstrated.

We have also evaluated a commercial glass, Corning 0080, for possible use as sealants for the SOFC. This is a soda-lime glass, with CTE of $9.35 \times 10^{-6}$/°C. Corning 0080 produced good bonds with YSZ but had unacceptable chemical and/or physical interactions with the NZC and LSM.

SUMMARY OF THE INVENTION

Therefore, in view of the above, it is an object of the present invention to provide a sealant for sealing the edges of cells in stacks, for sealing the external manifolds to a stack, or for sealing the gas flow channels in an internally-manifolded SOFC stack. Of course, the sealants may also be used at other points in the SOFC system, as well as for joining similar ceramics for high temperature use in a related or unrelated application.

Another object of the invention is to develop a sealant for an SOFC which is fluid at cell operating temperature and is chemically compatible with the ceramics making up the cell.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
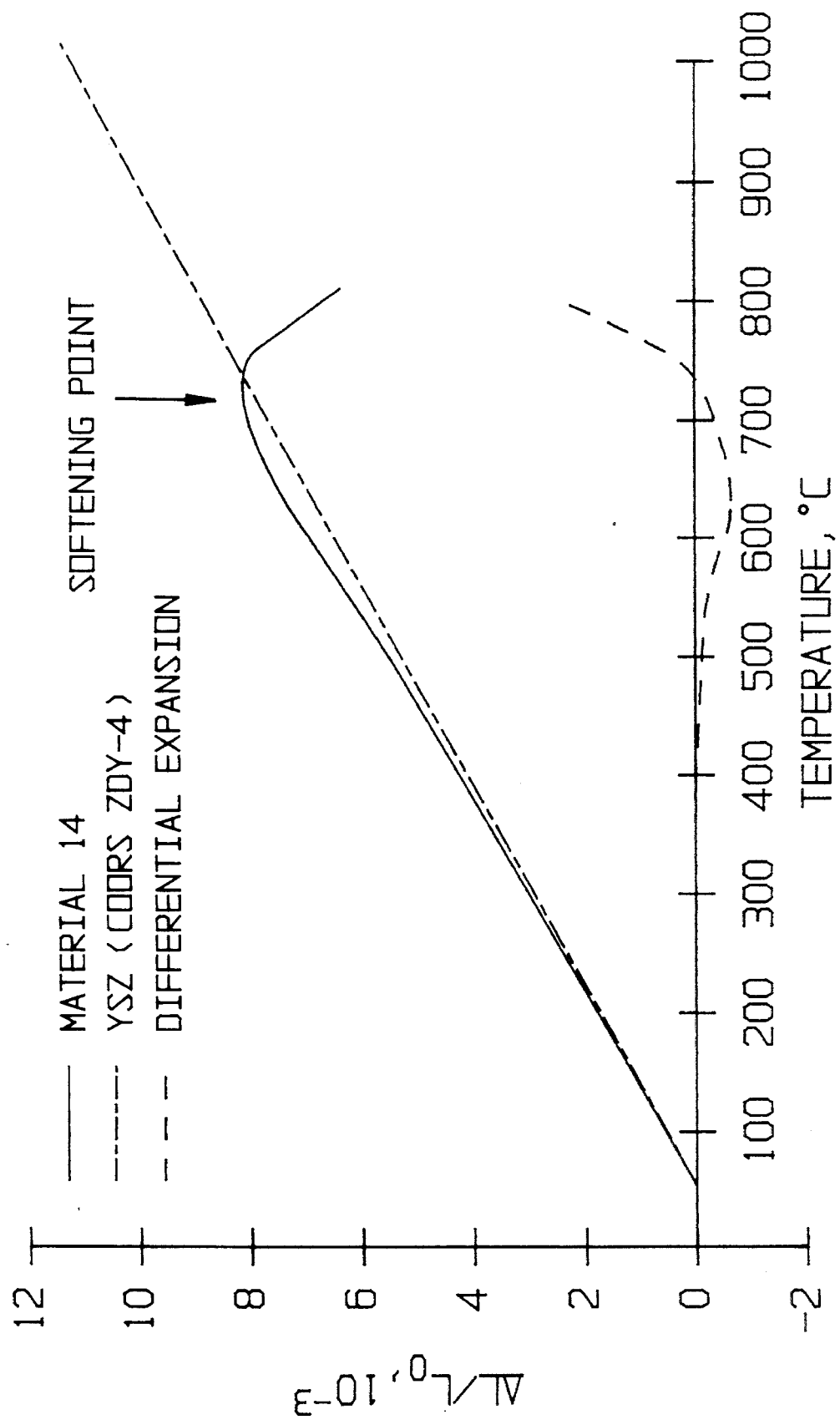
FIG. 1 is a graphical representation of the Mean Thermal Expansion of two materials as a function of temperature.

The sealants developed for the SOFC must satisfy some stringent requirements:

1. The sealant must adhere well to the different SOFC materials (LSM, YSZ, NZC, LC) after initial bond formation, at all temperatures from room temperature to the operating temperature. This implies that the sealant should have some interaction with the different SOFC materials in order to develop strong bonds with them. The required ability of the bond to withstand thermal cycling between room temperature and the operating temperature implies that the coefficient of thermal expansion (CTE) of the sealant material must be close to the CTEs of the SOFC materials, typically $10 \times 10^{-6}/°C$. over the range 25° to 1000° C.

2. The seal must form a gas-tight bond, i.e., the sealant must form a continuous impervious bead or gasket.

3. The sealant material must not chemically attack the SOFC materials excessively at temperatures up to the fuel cell's operating temperatures.

4. The sealant materials must be chemically stable in oxygen activities from 0.21 atm in air down to $10^{-18}$ atm and in carbon dioxide activity to 0.25 atm in the presence of water (exhausted fuel gas). The seal will typically have oxidizing and reducing conditions on either side; the gas environment of the seal must not cause chemical degradation of the material.

5. The sealant must permit easy and reproducible fabrication into arbitrary shapes and thicknesses to be used as pre-formed gaskets; the sealant must also be capable of being processed into a paste or other form that can be applied with ease to the surfaces to be sealed as a glue, cement or caulking.

We have developed a suitable sealant for the SOFC based on the concept of a compliant sealant, i.e., a sealant material that is a viscous fluid rather than a rigid solid at the operating temperature of the fuel cell. The developed material has a glass transition temperature ($T_g$) lower than the normal operating temperature, which reduces the probability of cell failure due to differences in the thermal expansion coefficients of the bonded components; rather, the sealant is able to "give" without unduly stressing the ceramic or ceramic/metal structures.

Thus, our approach was to develop glasses and glass-ceramics that are "soft" at 1000° C. (or at 800° C. for lower) cell operating temperature. For example, a sealant for use at 1000° C. may have $T_g$ below 1000° C. This sealant would then flow as needed at the design operating temperature. As the structure is cooled to room temperature, significant stresses would begin to develop only as the temperature drops below $T_g$ and the total stress due to thermal expansion mismatch would be less than if the stresses had begun developing at 1000° C. To minimize the stresses produced, therefore, it is desirable that the $T_g$ (which roughly corresponds to a viscosity of $\sim 10^{12}$ Pa-s) be as low as possible. At the same time, it is also necessary that the sealant viscosity at the cell's operating temperature be at least $10^3$ Pa-s to provide adequate physical strength of the seal; at a lower viscosity, the sealant would sag under its own weight.

The magnitude of stresses developed at sealed interfaces is affected by the differences in the CTEs of the joined materials, the glass-transition temperature of the sealant, and the elastic properties of the materials being joined. Thus, we developed a sealant material which has a CTE of approximately $10 \times 10^{-6}/°C$. and glass-transition temperatures in the range of 600 (for SOFCs operating at 800° C.) to 800° C. (for SOFCs operating at 1000° C.). In addition, we sought to reduce the temperature index of viscosity of the developed material, i.e., reduce the rate at which the viscosity decreases with increasing temperature, so that a sealant with a glass-transition temperature below the operating temperature would still have adequate rigidity at the normal operating temperature of the cell.

This combination of the desired properties is achieved in glasses (to obtain the low glass-transition temperatures) and glass-ceramics (to reduce the temperature index of viscosity) of the type hereinafter set forth.

We have developed glass and glass-ceramic sealants consisting of the oxides of the strontium, lanthanum, aluminum, boron, and silicon; in some formulations, the strontium oxide is replaced with calcium oxide.

Boron oxide serves as the basis of the glasses and glass-ceramics rather than silica which is used in the common glasses. Borate glasses have lower softening temperatures than silicate glasses of similar cation chemistry. The borate glass thus forms the bond at a temperature lower than that needed for the silicate glass. Further, the silica content is kept low to avoid the formation of the volatile silicon monoxide under the highly reducing conditions in the anode side of the fuel cell. Thus, the silica content of our sealants varies between 3 and 20 mol %, as compared to 50 mol % or more in the silica-based glasses used by others. Some silica is kept in the formulation because it enlarges the composition range in which a glass forms.

Strontium oxide (or calcium oxide) is primarily added to modify the CTE. Alumina is added to retard crystallization of strontium borate glass (or calcium borate for the calcia-containing glasses). Lanthanum oxide is found in the SOFC components (i.e. cathode and interconnect ceramics) and is added to modify the viscosity of the sealant. Using these oxides also helps to reduce the amount of inter-diffusion of material between the sealant and the SOFC or manifold materials, for two reasons. First, many of the same cations are present in the SOFC materials and, therefore, the concentration driving force is reduced. Second, these cations have a lower diffusivity than, say, sodium, because of their higher ionic charge and atomic mass.

Matching the CTE of the sealant to that of the SOFC materials is crucial to the success of the sealant. We used the method of Appen as set forth in Vol. 7 Chemical Approach To Glass, Glass Science and Technology Vol. 7, Elsevier, N.Y. 1984, to develop a model that can predict the expected CTE for any glass formulation of these oxides. This model was used to determine that to obtain a CTE between 9 and $13 \times 10^{-6}/°$. the sealant should be comprised of 5–60 mol %, SrO, 0–45 mol %, $La_2O_3$, 0–15 mol %, $Al_2O_3$ 15–80 mol % $B_2O_3$ and 0–40 mol % $SiO_2$. Based on these model calculations, we have made a number of sealant materials of different compositions. These formulations are summarized in Table 1.

Compliant Sealant Compositions and Properties

| Material ID | Nominal Composition, | mol % | Form | $T_g$, °C. | CTE, $10^{-6}$/°C. |
|---|---|---|---|---|---|
| 10 | SrO | 25.0 | Glass | | 7.51 |
| | La$_2$O$_3$ | 0.0 | | | (50–500° C.) |
| | Al$_2$O$_3$ | 10.0 | | | |
| | B$_2$O$_3$ | 60.4 | | | |
| | SiO$_2$ | 4.6 | | | |
| 11 | SrO | 20.0 | Glass | | 7.47 |
| | La$_2$O$_3$ | 0.0 | | | (50–500° C.) |
| | Al$_2$O$_3$ | 10.0 | | | |
| | B$_2$O$_3$ | 65.4 | | | |
| | SiO$_2$ | 4.6 | | | |
| 12 | SrO | 33.7 | Glass | | 7.98 |
| | La$_2$O$_3$ | 0.0 | | | (50–500° C.) |
| | Al$_2$O$_3$ | 10.0 | | | |
| | B$_2$O$_3$ | 51.7 | | | |
| | SiO$_2$ | 4.6 | | | |
| 14 | SrO | 28.7 | Glass-Ceramic | 740–780 | 11.5 |
| | La$_2$O$_3$ | 20.2 | | | (25–600° C.) |
| | Al$_2$O$_3$ | 10.0 | | | |
| | B$_2$O$_3$ | 36.6 | | | |
| | SiO$_2$ | 4.6 | | | |
| 15 | SrO | 8.5 | Glass | | |
| | La$_2$O$_3$ | 17.1 | | | |
| | Al$_2$O$_3$ | 10.0 | | | |
| | B$_2$O$_3$ | 59.8 | | | |
| | SiO$_2$ | 4.6 | | | |
| 23 | SrO | 22.0 | Glass-Ceramic | | |
| | La$_2$O$_3$ | 19.1 | | | |
| | Al$_2$O$_3$ | 10.0 | | | |
| | B$_2$O$_3$ | 44.3 | | | |
| | SiO$_2$ | 4.6 | | | |
| 33 | SrO | 45.6 | Crystalline | | |
| | La$_2$O$_3$ | 1.4 | | | |
| | Al$_2$O$_3$ | 17.3 | | | |
| | B$_2$O$_3$ | 27.7 | | | |
| | SiO$_2$ | 8.0 | | | |
| 34 | SrO | 32.1 | Glass | 620 | 9.33 |
| | La$_2$O$_3$ | 3.3 | | | (25–600° C.) |
| | Al$_2$O$_3$ | 15.8 | | | |
| | B$_2$O$_3$ | 41.6 | | | |
| | SiO$_2$ | 7.3 | | | |
| 35 | SrO | 34.0 | Glass | 740 | |
| | La$_2$O$_3$ | 14.3 | | | |
| | Al$_2$O$_3$ | 12.2 | | | |
| | B$_2$O$_3$ | 33.8 | | | |
| | SiO$_2$ | 5.6 | | | |
| 965-5 | SrO | 34.0 | Glass | 615, 765 | $10.3 \times 10^{-6}$ |
| | La$_2$O$_3$ | 9.0 | | | (25–600° C.) |
| | Al$_2$O$_3$ | 12.2 | | | |
| | B$_2$O$_3$ | 39.1 | | | |
| | SiO$_2$ | 5.6 | | | |
| 36 | SrO | 41.3 | Crystalline | | |
| | La$_2$O$_3$ | 17.7 | | | |
| | Al$_2$O$_3$ | 0.0 | | | |
| | B$_2$O$_3$ | 41.0 | | | |
| | SiO$_2$ | 0.0 | | | |
| 37 | SrO | 41.4 | Glass-ceramic | | |
| | La$_2$O$_3$ | 11.0 | | | |
| | Al$_2$O$_3$ | 0.0 | | | |
| | B$_2$O$_3$ | 47.6 | | | |
| | SiO$_2$ | 0.0 | | | |
| 41 | SrO | 32.1 | Glass | 560 | 8.82 |
| | La$_2$O$_3$ | 3.3 | | | (100–500° C.) |
| | Al$_2$O$_3$ | 15.8 | | | |
| | B$_2$O$_3$ | 48.9 | | | |
| | SiO$_2$ | 0.0 | | | |
| 42 | SrO | 32.1 | Glass | 560 | 9.69 |
| | La$_2$O$_3$ | 3.3 | | | (50–500° C.) |
| | Al$_2$O$_3$ | 15.8 | | | |
| | B$_2$O$_3$ | 43.9 | | | |
| | SiO$_2$ | 5.0 | | | |
| 43 | SrO | 32.1 | Glass | 700 | 9.20 |
| | La$_2$O$_3$ | 3.3 | | | (25–600° C.) |
| | Al$_2$O$_3$ | 15.8 | | | |
| | B$_2$O$_3$ | 38.9 | | | |

-continued

Compliant Sealant Compositions and Properties

| Material ID | Nominal Composition, | mol % | Form | $T_g$, °C. | CTE, $10^{-6}$/°C. |
|---|---|---|---|---|---|
| 44 | $SiO_2$ | 10.0 | Glass | | |
| | SrO | 32.1 | | | |
| | $La_2O_3$ | 3.3 | | | |
| | $Al_2O_3$ | 15.8 | | | |
| | $B_2O_3$ | 28.9 | | | |
| 45 | $SiO_2$ | 20.0 | Glass | 740–750 | 8.08 |
| | SrO | 32.1 | | | (100–500° C.) |
| | $La_2O_3$ | 3.3 | | | |
| | $Al_2O_3$ | 15.8 | | | |
| | $B_2O_3$ | 18.9 | | | |
| 47 | $SiO_2$ | 30.0 | Glass | 730 | 8.04 |
| | SrO | 35.4 | | | (50–505° C.) |
| | $La_2O_3$ | 0.0 | | | |
| | $Al_2O_3$ | 15.8 | | | |
| | $B_2O_3$ | 18.9 | | | |
| 77A | $SiO_2$ | 30.0 | Glass-ceramic | | |
| | SrO | 28.9 | | | |
| | $La_2O_3$ | 19.4 | | | |
| | $Al_2O_3$ | 10.3 | | | |
| | $B_2O_3$ | 36.7 | | | |
| 77B | $SiO_2$ | 4.9 | Glass-ceramic | | |
| | SrO | 29.5 | | | |
| | $La_2O_3$ | 18.8 | | | |
| | $Al_2O_3$ | 10.8 | | | |
| | $B_2O_3$ | 35.1 | | | |
| 77C | $SiO_2$ | 5.9 | Glass-ceramic | | |
| | SrO | 30.5 | | | |
| | $La_2O_3$ | 17.5 | | | |
| | $Al_2O_3$ | 11.6 | | | |
| | $B_2O_3$ | 33.7 | | | |
| 101 | $SiO_2$ | 6.7 | Glass | | 8.57 |
| | CaO | 35.0 | | | (50–600° C.) |
| | $La_2O_3$ | 0.0 | | | |
| | $Al_2O_3$ | 10.0 | | | |
| | $B_2O_3$ | 40.0 | | | |
| A | $SiO_2$ | 15.0 | Glass | 609 | 12.0 |
| | SrO | 42.9 | | | (50–500° C.) |
| | $La_2O_3$ | 9.5 | | | |
| | $Al_2O_3$ | 0.0 | | | |
| | $B_2O_3$ | 42.9 | | | |
| B | $SiO_2$ | 4.6 | Glass | 690 | 11.7 |
| | SrO | 39.1 | | | (50–500° C.) |
| | $La_2O_3$ | 10.5 | | | |
| | $Al_2O_3$ | 0.0 | | | |
| | $B_2O_3$ | 45.8 | | | |
| 965-23 | $SiO_2$ | 4.6 | Glass-ceramic | | |
| | SrO | 45.6 | | | |
| | $La_2O_3$ | 4.8 | | | |
| | $Al_2O_3$ | 3.0 | | | |
| | $B_2O_3$ | 46.6 | | | |
| 965-25 | $SiO_2$ | 0.0 | Glass-ceramic | | |
| | SrO | 45.0 | | | |
| | $La_2O_3$ | 10.0 | | | |
| | $Al_2O_3$ | 0.0 | | | |
| | $B_2O_3$ | 45.0 | | | |
| | $SiO_2$ | 0.0 | | | |

The model was also used to predict a La-free, Ca-based compositions with a range of CTEs of $10$–$12 \times 10^{-6}$/°C. For this CTE range the sealant should be comprised of 0–35 mol % CaO, 0–15 mol % $Al_2O_3$, 35–85 mol % $B_2O_3$ and 0–30 mol % $SiO_2$. A formulation in this composition range is given in Table 1.

All compositions were made by milling together stoichiometric amounts of $M(NO_3)_2$ (where M=Ca or Sr), $La_2O_3$, $Al_2O_3$, $SiO_2$ and $H_3BO_3$ in methanol. The mixture was then dried, calcined at 800° C., heated further to 1400° C., quenched, and then ground to a powder to produce the sealant material. This material can be applied either as a paste with a suitable solvent, or as a tape produced by standard tape-casting techniques i.e., using a solvent, binder, plasticizer, and dispersant, all well known in the art. For use as the paste, the sealant is applied directly as a bead of caulking to the joint to be sealed; for use as the tape, the green tape is cut to shape (e.g., as a gasket) and heated to remove the binder and partially to shrink the gasket. In either case, the final densification and bonding is achieved by heating the substrate/structure to 800–1000° C.

Two examples of the sealant material produced in this way are Material 14 and Material 34. The former consists of 28.7 mol % SrO, 20.2 mol % $La_2O_3$, 10.0 mol % $Al_2O_3$, 36.6 mol % $B_2O_3$, and 4.5 mol % $SiO_2$. The latter consists of 32.1 mol % SrO, 3.3 mol % $La_2O_3$, 15.8 mol % $Al_2O_3$, 41.6 mol % $B_2O_3$, and 7.3 mol % $SiO_2$. Material 14 is a glass-ceramic with a $T_g$ of 740–780° C., an average CTE of $11.5 \times 10^{-6}$/°C.

over the temperature range of 26° to 600° C. and a viscosity of $10^6$ to $10^7$ Pa-s at 1000° C. Material 34 is a glass with a $T_g$ of 620° C. and an average CTE of $9.33 \times 10^{-6}$/°C. over the temperature range of 25 to 600° C. This glass was also drawn into thin fibers for use as a sealant, in addition to being used in the form of a powder or tape.

Figure 2:
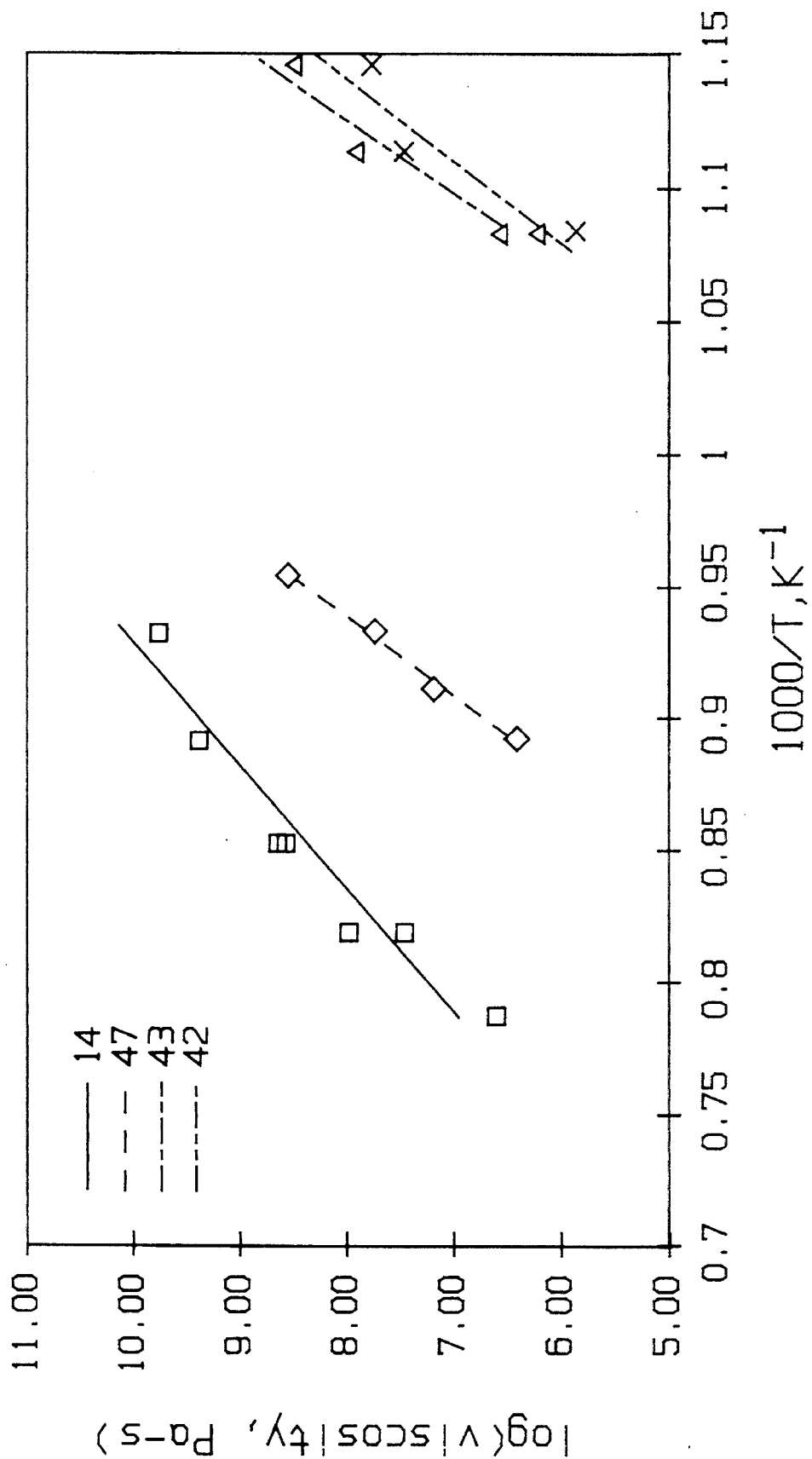
FIG. 2 is a graphical representation of the viscosity of four inventive materials as a function of temperature.

We measured three key physical properties of the sealants; the glass transition temperature ($T_g$), the coefficient of thermal expansion from room temperature to a temperature near the $T_g$, and the viscosity at or near the expected operating temperature. For the glass-ceramic material, the $T_g$ was defined as that of the glass phase. The thermal expansion of a glass-ceramic with temperature is shown in FIG. 1; for this Material 14, the thermal expansion is well matched with that of YSZ, which is also shown in FIG. 1 for comparison. As the glass-ceramic approaches $T_g$, the CTE increases rapidly. The viscosity of the "soft" sealant becomes important in releasing stress at higher temperatures. In theory, stress can be released by viscous flow if the viscosity of the material is $10^{12}$ Pa-s or less. For a glass, this viscosity is attained near its $T_g$. FIG. 2 shows the viscosity versus temperature behavior for four of the sealants. For Material 14, for example, the viscosity at 1000° C. is $10^{6.5}$ Pa-s and indicates that stress can be readily released by viscous flow. Thus, minimal stresses will exist in a bond made with this sealant in the temperature region of 780°–1000° C. At temperatures below $T_g$, the glass and glass-ceramic sealants behave as elastic solids; therefore, the stresses produced will be proportional to the difference in CTE of the sealant and the substrates.

The glass transition temperatures and the CTEs of the sealant preparations are also listed in Table 1 (for the materials for which they were measured).

These sealants were found to be chemically stable in oxidizing air and reducing humidified hydrogen and carbon dioxide environments at the normal operating temperature. After exposing samples of the sealants to these gases for 120 hours at 1000° C., no significant change in weight or physical appearance was observed. Also, no significant change was detected by x-ray diffraction. Samples of these sealant materials, in particular, Materials 14 and 34, were tested for the ability to form adherent, gas-impervious seals with different SOFC materials.

To test for bonding and thermal cyclability of the bonds, test sandwiches of substrate materials (YSZ, LSM, NZC and LC) and the selected sealant were prepared in a standardized manner and heated repeatedly over shallow (between 400° and 1000° C.) and deep (between 25° and 1000° C.) thermal cycles. All of the bonding tests with Material 14 were successful; no evidence of cracking or delamination were observed.

The sealing ability of the glass-ceramic sealant was tested mechanically (a cell pressurized with air and leak-checked with soap solution) and electrochemically (as a cell consisting of a YSZ disc sealed to a stabilized-zirconia tube. In the latter test, with humidified hydrogen as the fuel gas on one side and furnace air as the oxidant on the other side, the open-circuit voltage was measured to be 99% of the theoretical voltage. Monitoring the change in cell voltage over time with the fuel flow shut off indicated very slow permeation of air into the fuel side across the seal.

To examine potential materials interactions, samples of the sealants were heated in contact with the different SOFC materials for various lengths of time at 1000° C. Every bond exhibited migration of chemical species from the SOFC ceramic into the sealant; strong bonds, however, were produced in each case, as for the test sandwiches described above. The bond with LSM, the air electrode, showed some migration of manganese into the glass phase of the sealant, but no physical deterioration of the bond. The bond with NZC, the fuel electrode, showed some wicking of the glass phase of the sealant into the NZC, leaving behind an apparently porous layer of the sealant. In the bond with LC, the interconnect material, significant diffusion of chromium into the sealant was observed.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A glass or glass-ceramic sealant for a SOFC comprising a material having a coefficient of thermal expansion in the range of from about 8 to about $13 \times 10^{-6}$/°C. having a composition of SrO present in the range of from about 5 to about 60 mole percent, $La_2O_3$ present in the range of from about 1 to about 45 mole percent, $Al_2O_3$ present in the range from 0 to about 15 mole percent, $B_2O_3$ present in the range of from about 15 mole percent to about 80 mol %, and $SiO_2$ present in the range of from 0 to about 40 mol %, wherein the material is a viscous fluid at cell operating temperatures of from about 600° C. to about 1000° C.

2. The sealant of claim 1, herein the constituents are present as 28.7 mole % SrO; 20.2 mole % $La_2O_3$, 10 mole % $Al_2O_3$, 36.6 mole % $B_2O_3$ and 4.6 mole % $SiO_2$.

3. The sealant of claim 1, wherein the constituents are present as 32.1 mole % SrO, 3.3 mole % $La_2O_3$, 15.8 mol % $Al_2O_3$, 41.6 mole % $B_2O_3$ and 7.3 mole % $SiO_2$.

4. The sealant of claim 1, wherein the coefficient of thermal expansion is in the range of from about 11 to about $13 \times 10^{-6}$/°C.

5. The sealant of claim 1, wherein the sealant has a glass transition temperature below the SOFC operating temperature.

6. The sealant of claim 1, wherein the sealant viscosity at cell operating temperature is at least $10^3$ Pa-s.

7. The sealant of claim 1, wherein the sealant viscosity at cell operating temperature is not greater than about $10^{12}$ Pa-s.

8. A solid oxide fuel cell for electrochemically reacting a fuel gas with a flowing oxidant gas at an elevated temperature in producing a DC output voltage, said solid oxide fuel cell comprising a plurality of generally planar conductive sheets of thin layers of ceramic anode and cathode materials and a thin layer of ceramic ion conducting electrolyte disposed therebetween, wherein said ceramics include manganite and zirconias, a glass or glass-ceramic sealant for connecting adjacent sheets, said sealant having a coefficient of thermal expansion in the range of from about 8 to about $13 \times 10^{-6}$/°C. having a composition of SrO present in the range of from about 5 to about 60 mole %, $La_2O_3$ present in the range of from about 1 to about 45 mole %, $Al_2O_3$ present in the range from 0 to about 15 mole %, $B_2O_3$ present in the range of from about 15 mole %, to about 80 mole %, and $SiO_2$ present in the range of from 0 to about 40 mole %, wherein the material is a viscous fluid at cell operating temperatures of from about 600° C. to about 1000° C.

9. The solid oxide fuel cell of claim 8, wherein the sealant constituents are present as 28.7 mole % SrO; 20.2 mole % $La_2O_3$, 10 mole % $Al_2O_3$, 36.6 mole % $B_2O_3$ and 4.6 mole % $SiO_2$.

10. The solid oxide fuel cell of claim 8, wherein the sealant constituents are present as 32.1 mole % SrO, 3.3 mole % $La_2O_3$, 15.8 mole % $Al_2O_3$, 41.6 mole % $B_2O_3$ and 7.3 mole % $SiO_2$.

11. The solid oxide fuel cell of claim 8, wherein the coefficient of thermal expansion is in the range of from about 11 to about $13 \times 10^{-6}$/°C., the sealant has a glass transition temperature below the SOFC operating temperature, and the sealant viscosity at cell operating temperature is at least $10^3$ Pa-S.

12. A solid oxide fuel cell for electrochemically reacting a fuel gas with a flowing oxidant gas at an elevated temperature in producing a DC output voltage, said solid oxide fuel cell comprising a plurality of generally planar conductive sheets of thin layers of ceramic anode and cathode materials and a thin layer of ceramic ion conducting electrolyte disposed therebetween, wherein said ceramics include manganite and zirconias, a glass or glass-ceramic sealant for connecting adjacent sheets, said sealant having a coefficient of thermal expansion in the range of from about 8 to about $13 \times 10^{-6}$/°C. having a composition of SrO present in the range of from about 5 to about 60 mole %, $La_2O_3$ present in the range of from about 3 to about 45 mole %, $Al_2O_3$ present in the range from 0 to about 15 mole %, $B_2O_3$ present in the range of from about 15 mole % to about 80 mole %, and $SiO_2$ present in the range of from 0 to about 40 mole %, wherein the material is a viscous fluid at cell operating temperatures of from about 600° C. to about 1000° C.

13. The solid oxide fuel cell of claim 12, wherein the sealant coefficient of thermal expansion is in the range of from about 11 to about $13 \times 10^{-6}$/°C., the sealant has a glass transition temperature below the SOFC operating temperature, and the sealant viscosity at cell operating temperature is at least $10^3$ Pa-s.

* * * * *